(12) United States Patent
Li

(10) Patent No.: US 12,361,503 B2
(45) Date of Patent: Jul. 15, 2025

(54) DRIVING TIMETABLE GENERATION METHODS AND ELECTRONIC DEVICES

(71) Applicant: IE-CHENG TECHNOLOGY (TIANJIN) CO., LTD., Tianjin (CN)

(72) Inventor: Chunming Li, Tianjin (CN)

(73) Assignee: IE-CHENG TECHNOLOGY (TIANJIN) CO., LTD., Tianjin (CN)

( * ) Notice: Subject to any disclaimer, the term of this patent is extended or adjusted under 35 U.S.C. 154(b) by 213 days.

(21) Appl. No.: 18/040,037

(22) PCT Filed: Aug. 11, 2020

(86) PCT No.: PCT/CN2020/108474
§ 371 (c)(1),
(2) Date: Jan. 31, 2023

(87) PCT Pub. No.: WO2022/021474
PCT Pub. Date: Feb. 3, 2022

(65) Prior Publication Data
US 2023/0306546 A1  Sep. 28, 2023

(30) Foreign Application Priority Data

Jul. 31, 2020 (CN) .......................... 202010764831.1

(51) Int. Cl.
*G01C 21/00* (2006.01)
*G06Q 50/26* (2012.01)
*G08G 1/123* (2006.01)

(52) U.S. Cl.
CPC ............. *G06Q 50/26* (2013.01); *G08G 1/123* (2013.01)

(58) Field of Classification Search
CPC ........ G06Q 50/26; G06Q 50/40; G06Q 10/04; G08G 1/123; G08G 1/0112; G08G 1/0129;
(Continued)

(56) References Cited

U.S. PATENT DOCUMENTS 9,014,974 B2 * 4/2015 Venkatraman .......... G01S 19/26
701/470
9,117,182 B2 * 8/2015 Bapna .................. G06Q 10/025
(Continued)

FOREIGN PATENT DOCUMENTS

CN      103426298      12/2013
CN      103778800      5/2014
(Continued)

OTHER PUBLICATIONS

International Search Report issued in Application No. PCT/CN2020/108474 dated Apr. 26, 2021.
(Continued)

*Primary Examiner* — Jonathan M Dager
(74) *Attorney, Agent, or Firm* — DLA Piper LLP (US)

(57) ABSTRACT

Driving timetable generation methods and electronic devices are disclosed. The methods and electronic devices can comprise or be configured for: acquiring a preset driving route of a public transport vehicle, the driving route comprising multiple stations; sequentially extracting driving intervals of two adjacent stations in the driving route in the direction from a starting station to a terminal station among the plurality of stations; for each driving interval, determining, according to an interval attribute of the driving interval, a driving duration of the public transport vehicle passing through the driving interval; on the basis of a preset departure moment of the public transport vehicle and the driving duration of each driving interval corresponding to the departure moment, calculating time information that the public transport vehicle corresponding to the departure moment arrives at each station in the driving route; and generating, according to the time information, a driving timetable corresponding to the departure moment of the public transport vehicle on the current driving route.

12 Claims, 5 Drawing Sheets

(58) Field of Classification Search
CPC ........ G08G 1/0141; G08G 1/08; G08G 1/081; G01C 21/26; G06F 16/9537; G06F 16/29
See application file for complete search history.

(56) References Cited

U.S. PATENT DOCUMENTS

| | | | | |
|---|---|---|---|---|
| 9,530,314 | B2* | 12/2016 | Maitra | G08G 1/123 |
| 9,536,210 | B2* | 1/2017 | Handley | G06Q 10/04 |
| 9,631,939 | B2* | 4/2017 | Brenner | G01C 21/343 |
| 9,836,979 | B2* | 12/2017 | Handley | G08G 1/133 |
| 9,857,190 | B2* | 1/2018 | Marueli | G01C 21/34 |
| 9,900,747 | B1* | 2/2018 | Park | H04W 4/029 |
| 10,332,041 | B2* | 6/2019 | Gonzalez | G06Q 50/14 |
| 11,514,787 | B2* | 11/2022 | Suzuki | G01C 21/3605 |
| 11,841,231 | B2* | 12/2023 | Kitchen | G07C 5/0816 |
| 2010/0235082 | A1* | 9/2010 | Taniyama | G06Q 50/00 701/533 |
| 2012/0209506 | A1* | 8/2012 | Tamayama | G01C 21/3664 701/410 |
| 2014/0089036 | A1* | 3/2014 | Chidlovskii | G06Q 10/06315 705/7.27 |
| 2014/0244110 | A1* | 8/2014 | Tharaldson | G06Q 50/01 701/99 |
| 2014/0288821 | A1* | 9/2014 | Modica | G08G 1/127 701/465 |
| 2015/0045068 | A1* | 2/2015 | Soffer | G01C 21/20 455/456.3 |
| 2015/0199697 | A1* | 7/2015 | Handley | G08G 1/205 705/7.31 |
| 2017/0200249 | A1* | 7/2017 | Ullrich | G06Q 50/40 |
| 2018/0130100 | A1* | 5/2018 | Kim | G06Q 10/047 |
| 2020/0175429 | A1* | 6/2020 | Beaurepaire | G06Q 10/02 |
| 2020/0249027 | A1* | 8/2020 | Schmidt | H04W 4/024 |
| 2020/0249028 | A1* | 8/2020 | Fridin | G01C 21/3841 |
| 2021/0304098 | A1* | 9/2021 | Yang | G01C 21/3415 |
| 2021/0372800 | A1* | 12/2021 | Primack | G06V 20/588 |
| 2023/0013604 | A1* | 1/2023 | Neill | G08G 1/0112 |
| 2023/0168094 | A1* | 6/2023 | Beaurepaire | G01C 21/3697 701/425 |

FOREIGN PATENT DOCUMENTS

| | | | |
|---|---|---|---|
| CN | 103996300 | 8/2014 | |
| CN | 104680829 | 6/2015 | |
| CN | 105096643 | 11/2015 | |
| EP | 3572991 A1 * | 11/2019 | ............. G01C 21/26 |
| EP | 4187204 A1 * | 5/2023 | ......... G01C 21/3438 |

OTHER PUBLICATIONS

Partial English Abstract of CN 103778800 published May 7, 2014.
Partial English Abstract of CN 105096643 published Nov. 25, 2015.
Partial English Abstract of CN 103996300 published Aug. 20, 2014.
Partial English Abstract of CN 104680829 published Jun. 3, 2015.
Partial English Abstract of CN 103426298 published Dec. 4, 2013.

* cited by examiner

DRIVING TIMETABLE GENERATION METHODS AND ELECTRONIC DEVICES

CROSS-REFERENCE TO RELATED APPLICATION

This application is a U.S. National Stage Application of International Application No. PCT/CN2020/108474 filed Aug. 11, 2020, and the title of "DRIVING TIMETABLE GENERATION METHOD AND APPARATUS, AND ELECTRONIC DEVICE" which claims priority from Chinese Patent Application No. CN202010764831.1, filed Jul. 31, 2020. The entirety of all the above-listed applications are incorporated herein by reference.

TECHNICAL FIELD

The present disclosure relates to the technical field of intelligent transportation, in particular to a driving timetable generation method and apparatus, and an electronic device.

BACKGROUND ART

With the improvement of people's living standard, the number of private cars is increasing significantly, and traffic jams and pollution become very serious social problems. In order to solve these problems, a feasible method needs to be conceived to vigorously develop urban public transport so as to solve people's daily commuting problems. In the process of daily commuting, the most common problem people encounter is that there is no timetable for public transport vehicles; waiting time is unpredictable; and under normal conditions, in rush hours, people often wait for a long time before public transport vehicles arrive, whereas sometimes many public transport vehicles arrive at the same time. Thus in daily life, a definite timetable of the public transport vehicles is urgently needed, so that the public transport vehicles are controlled and scheduled strictly according to the timetable, and people travel according to the timetable, thereby facilitating people's life.

The conventional compiling method of the public transport timetable is manual compilation, and it is quite difficult to form a set of complete, scientific, and feasible driving plan by the method merely depending on personal experience. In addition, most of the existing intelligent compiling and optimizing methods are based on statistical analysis of historical operating data of the public transport vehicles, and influences of external environment interferences on the driving condition in the driving process of the public transport vehicles are not taken into full consideration, therefore, the timetable provided by the existing compiling method is not ideal and cannot meet the users' daily travel demands.

SUMMARY

In view of this, an objective of the present disclosure lies in providing a driving timetable generation method and apparatus, and an electronic device, which provide a complete timetable of all shifts and stations of a public transport vehicle, so as to satisfy users' travel demands and improve the users' experience.

In the first aspect, an embodiment of the present disclosure provides a driving timetable generation method, which includes: acquiring a preset driving route of a public transport vehicle, wherein the driving route includes multiple stations; extracting the driving intervals between every two adjacent stations in the driving route sequentially in the direction from the starting station to the terminal station; determining, for each driving interval, a driving duration of the public transport vehicle passing through according to the attribute of the interval; calculating, on the basis of a preset departure moment of the public transport vehicle and the driving duration of each of the driving intervals corresponding to the departure moment, time information about the public transport vehicle arriving at each of the stations in the driving route corresponding to the departure moment; and generating the driving timetable corresponding to the departure moment of the public transport vehicle on the current driving route according to the time information.

In combination with the first aspect, an embodiment of the present disclosure provides a first possible embodiment of the first aspect, wherein the step of determining a driving duration of the public transport vehicle passing through the driving interval according to the attribute of the driving interval includes: planning the driving interval according to the interval attribute, to obtain multiple interval road sections; and calculating, on the basis of a standard driving speed curve of the interval road sections, the driving duration for the public transport vehicle to pass through the interval.

In combination with the first possible embodiment of the first aspect, an embodiment of the present disclosure provides a second possible embodiment of the first aspect, wherein the above interval attribute includes information of intersections and/or speed limit zonesections; and the steps of planning the driving interval according to the interval attribute include: determining the separation points in the driving interval according its attribute, wherein the separation points include the intersections and/or a speed limit zonesections; and dividing the driving interval into interval road sections according to the separation points.

In combination with the second possible embodiment of the first aspect, an embodiment of the present disclosure provides a third possible embodiment of the first aspect, wherein the steps of calculating, on the basis of a standard driving speed curve of the interval road sections, a driving duration for the public transport vehicle to pass through the driving interval include: acquiring an interval road section starting position, an interval road section end position, an interval road section starting speed, an interval road section end speed, an interval road section starting moment, an interval road section acceleration, and an interval road section platform speed, and generating the standard driving speed curve of the interval road section, wherein an initial value of the interval road section platform speed is the average traffic speed; calculating, on the basis of the standard driving speed curve, the interval road section end moment of each interval road section; obtaining, according to the end moment of each interval road section in a current driving interval, time information about the public transport vehicle arriving at an terminal station corresponding to the current driving interval; and calculating the driving duration for the public transport vehicle to pass through the current driving interval according to time information about the starting station corresponding to the current driving interval and time information about the terminal station corresponding to the current driving interval, wherein the time information about the starting station corresponding to the current driving interval is time information about the public transport vehicle arriving at the terminal station corresponding to the previous driving interval.

In combination with the third possible embodiment of the first aspect, an embodiment of the present disclosure provides a fourth possible embodiment of the first aspect, wherein the separation point is an intersection, and the step of calculating, on the basis of the standard driving speed curve, the interval road section end moment of each interval road section includes: calculating the arrival moment when the public transport vehicle arrives at the end point of the interval road section on the basis of the standard driving speed curve of the interval road section, wherein the end point of the interval road section is an entrance of the intersection; and judging whether the arrival moment is within an intersection green-light period corresponding to the intersection; if so, and arrival moments of the public transport vehicle and adjacent vehicles satisfy an moment threshold, taking the arrival moment as the interval road section end moment of the public transport vehicle in the corresponding interval road section; and if not, adjusting the arrival moment, and taking the adjusted arrival moment as the interval road section end moment of the public transport vehicle in the corresponding interval road section.

In combination with the fourth possible embodiment of the first aspect, an embodiment of the present disclosure provides a fifth possible embodiment of the first aspect, wherein the separation point is a speed limit zone, the step of calculating, on the basis of the standard driving speed curve, the interval road section end moment of each interval road section includes: calculating the arrival moment when the public transport vehicle arrives at the end point of the interval road section on the basis of the standard driving speed curve of the interval road section, wherein the end point of the interval road section is an entrance of the speed limit zone; and judging whether the arrival moment and arrival moments of adjacent vehicles satisfy the moment threshold; if so, taking the arrival moment as the interval road section end moment of the public transport vehicle in the interval road section; and if not, adjusting the arrival moment, and taking the adjusted arrival moment as the interval road section end moment of the public transport vehicle in the interval road section.

In combination with the fourth possible embodiment of the first aspect, an embodiment of the present disclosure provides a sixth possible embodiment of the first aspect, wherein the step of obtaining, according to the end moment of each interval road section in a current driving interval, time information about the public transport vehicle arriving at an terminal station corresponding to the current driving interval includes: obtaining the arrival moment when the public transport vehicle arrives at the terminal station corresponding to the current driving interval according to the end moment of each interval road section in the current driving interval; and judging whether the arrival moment and arrival moments of adjacent vehicles at the terminal station corresponding to the current driving interval satisfy the moment threshold, if so, taking the arrival moment as the time information about the public transport vehicle arriving at the terminal station corresponding to the current driving interval; and if not, adjusting the arrival moment, and taking the adjusted arrival moment as the time information about the public transport vehicle arriving at the terminal station corresponding to the current driving interval.

In combination with the first aspect, an embodiment of the present disclosure provides a seventh possible embodiment of the first aspect, wherein the method further includes: generating the vehicle operation parameters of the public transport vehicle according to the driving timetable, and sending the vehicle operation parameters to the public transport vehicle, so that the public transport vehicle travels in accordance with the vehicle operation parameters.

In combination with the first aspect, an embodiment of the present disclosure provides an eighth possible embodiment of the first aspect, wherein the method further includes: simulating the driving timetable in accordance with a preset mode, so as to improve the driving timetable, wherein the preset mode is a time mode.

In the second aspect, an embodiment of the present disclosure further provides a driving timetable generation apparatus, wherein the apparatus includes: a driving route acquisition module, configured to acquire a preset driving route of a public transport vehicle, wherein the driving route includes multiple stations; a driving interval extraction module, configured to extract a driving interval of two adjacent stations in the driving route sequentially in a direction from the starting station to the terminal station in the multiple stations; a driving duration determining module, configured to determine, for each driving interval, a driving duration of the public transport vehicle passing through the driving interval according to the attribute of the driving interval; a time information calculating module, configured to calculate, on the basis of a preset departure moment of the public transport vehicle and the driving duration of each of the driving intervals corresponding to the departure moment, time information about the public transport vehicle arriving at each station in the driving route corresponding to the departure moment; and a driving timetable generation module, configured to generate the driving timetable corresponding to the departure moment of the public transport vehicle on the current driving route according to the time information.

In the third aspect, an embodiment of the present disclosure further provides an electronic device, including a memory, a processor, and a computer program stored on the memory and executable on the processor, wherein the processor, when executing the computer program, implements the steps of the driving timetable generation method in the first aspect.

In the fourth aspect, an embodiment of the present disclosure further provides a computer-readable storage medium, wherein the computer-readable storage medium stores a computer program, and the computer program, when being run by a processor, executes the steps of the driving timetable generation method in the first aspect.

The embodiments of the present disclosure bring about the following beneficial effects:

The embodiments of the present disclosure provide the driving timetable generation method and apparatus, and the electronic device, wherein the preset driving route of the public transport vehicle is acquired, wherein the driving route includes multiple stations; the driving interval of two adjacent stations in the driving route is extracted sequentially in the direction from the starting station to the terminal station in the multiple stations; for each driving interval, the driving duration of the public transport vehicle passing through the driving interval is determined according to the attribute of the driving interval; on the basis of the preset departure moment of the public transport vehicle and the driving duration of each driving interval corresponding to the departure moment, time information about the public transport vehicle arriving at each station in the driving route corresponding to the departure moment is calculated; and the driving timetable corresponding to the departure moment of the public transport vehicle on the current driving route is generated according to the time information. In this mode, a complete timetable of all shifts and stations of the public transport vehicle is provided, so as to satisfy the users' travel demands and improve the users' experience.

Other features and advantages of the present disclosure will be illustrated in following description, and will partially become obvious from the description, or understood by implementing the present disclosure. The objectives and other advantages of the present disclosure are achieved and obtained through the structures specifically indicated in the description and the accompanying drawings.

In order to make the above objectives, features, and advantages of the present disclosure more apparent and understandable, preferred embodiments are particularly illustrated below in combination with attached accompanying drawings to make the following detailed description.

BRIEF DESCRIPTION OF DRAWINGS

In order to illustrate the technical solutions in specific embodiments of the present disclosure or in the prior art more clearly, accompanying drawings which need to be used in the description of the specific embodiments or the prior art will be introduced briefly below, and apparently, the accompanying drawings in the description below merely show some embodiments of the present disclosure, and those ordinarily skilled in the art still could obtain other accompanying drawings in light of these accompanying drawings without any creative effort.

DETAILED DESCRIPTION OF EMBODIMENTS

Figure 1:
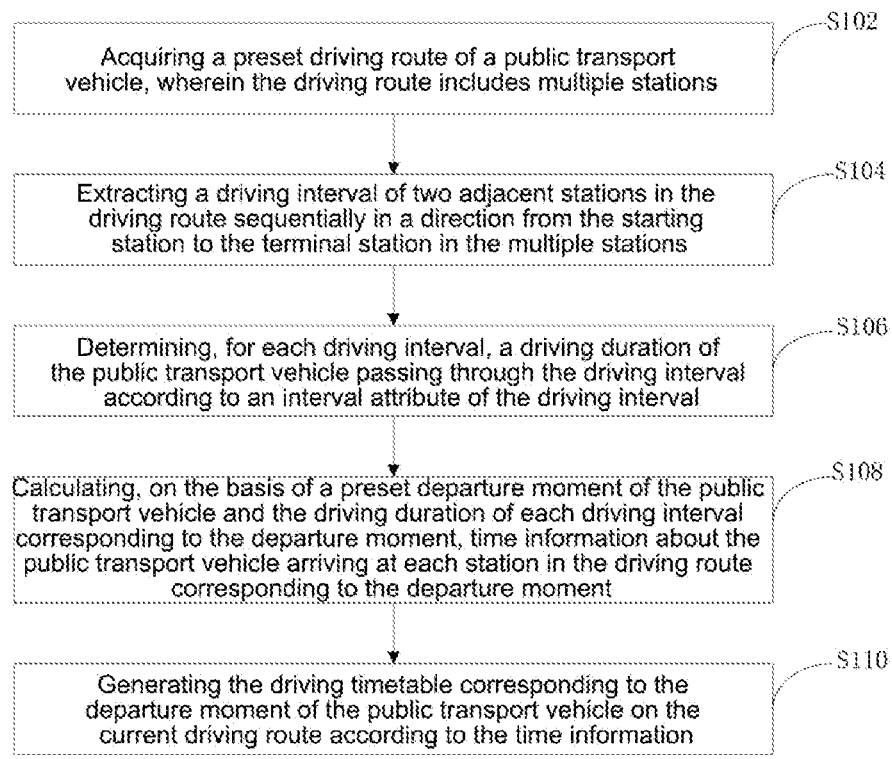
FIG. 1 is a flowchart of a driving timetable generation method provided in an embodiment of the present disclosure.

In order to clarify the objectives, technical solutions, and advantages of the embodiments of the present disclosure, the technical solutions of the present disclosure will be described clearly and completely below in conjunction with the accompanying drawings. It must be pointed out that only some embodiments of the present disclosure, not all of them, are described. Based on the embodiments in the present disclosure, all of the other embodiments obtained by a person ordinarily skilled in the art without using creative efforts shall fall within the scope of protection of the present disclosure.

At present, for buses and trains among public transport vehicles, the buses at home and abroad generally have only departure time plans instead of timetables, while the trains have a set of complete driving plan and timetable system.

The conventional compiling method of the public transport timetable is manual compilation, and this method mainly has the following problems: firstly, the conventional compilation of driving plan of the public transport vehicles mostly depends on personal experience and historical data analysis of dispatchers, i.e., they rely on the familiarity of the dispatchers with the distribution of passenger flow on the line, thus, the specific compilation thereof can hardly be clearly described with accurate logic and language and compiled into a table, and the compilation result of driving plan tends to vary from person to person. Secondly, the driving timetable conventionally compiled is inconvenient to modify, and if departure moment or interval of a certain shift needs to be adjusted, some adjustment may also need to be made to adjacent shifts before and after this shift, so the data that have been filled in must be erased, and the adjustment is troublesome and brings a huge amount of task to the dispatchers. Thirdly, the conventional manual compilation of public transport vehicle driving plan has the characteristics of long time consumption, slow updating, and low efficiency, and according to investigation results, by using the conventional manual compilation method, the compilation of one driving plan requires at least one week and is updated only once a quarter of a year, therefore, actual changes of operation of the public transport system cannot be truly reflected. Finally, as the conventional manual compilation of public transport vehicle driving plan is not scientifically reasonable and lacking in coordinated thinking, it is only suitable for line scheduling, but is not ideal for applications on wider scales.

With the development of computer technologies, the driving plan of the public transport vehicles steps into an intelligent compilation and optimization stage. Specifically, each step of the driving plan of the vehicles is continuously optimized according to real-time data acquired by the system, primarily based on automatic scheduling of an intelligent scheduling system by the computer, and supplemented by manual monitoring, which not only can meet the real-time and intelligent requirements of intelligent scheduling, but also can reduce the work intensity of dispatching staff. A conventional public transport vehicle intelligent dispatching system needs to continuously adjust dispatching instructions to the public transport vehicles according to the real-time operation condition of the public transport system and the public transport operation policy, and it is a core subsystem of the intelligent public transport system. Therefore, the intelligent compilation and optimization of the vehicle driving plan has the characteristics of making the vehicle driving plan compilation dynamic and making the vehicle scheduling intelligent, and further integrating the planning in the conventional sense and intelligent scheduling.

However, neither the conventional manual compiling method nor the existing intelligent compiling method takes the influences of external environment interferences on the driving condition in the driving process of the public transport vehicles into full consideration, thus the timetable provided by the existing compiling method is not ideal and cannot meet the users' daily travel demands. Based on this, an embodiment of the present disclosure provides a driving timetable generation method and apparatus, and an electronic device, which provide a complete timetable of all shifts and stations of the public transport vehicle, so as to satisfy the users' travel demands and improve the users' experience.

In order to facilitate understanding of the present embodiment, a driving timetable generation method provided in an embodiment of the present disclosure is introduced first in detail below.

Embodiment 1

An embodiment of the present disclosure provides a driving timetable generation method, with a server as the main execution unit, and as shown in FIG. 1, the method includes the following steps:

Step S102, acquiring a preset driving route of a public transport vehicle, wherein the driving route includes multiple stations.

Specifically, before compiling a driving timetable of the public transport vehicles, the preset driving route of the public transport vehicles needs to be acquired first, wherein the driving route includes multiple stations, i.e., multiple stations where the public transport vehicle passes and stops on a fixed operation route, wherein the fixed operation route herein includes road sections passed through in an up direction and a down direction. In practical application, the stations include a starting station, a terminal station, and multiple stations arranged between them, and the multiple stations are provided with different serial numbers in the direction from the starting station to the terminal station. In the above, each station includes an entry, a platform, and an exit. In practical application, each station is provided with a platform where one or more public transport vehicles stop, and the vehicles on the same line have a unique fixed stop position at each station.

Figure 2:
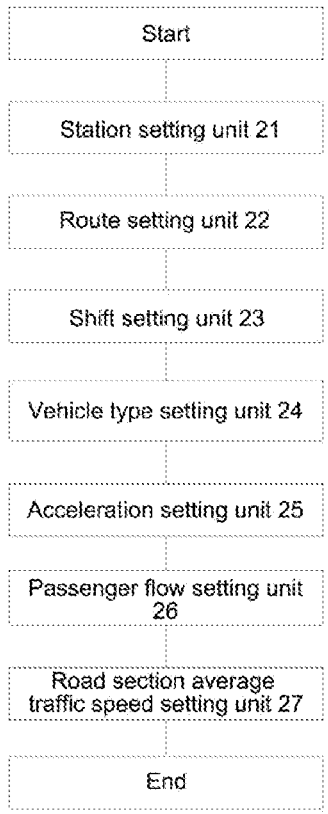
FIG. 2 is a schematic diagram of preliminary setting work provided in an embodiment of the present disclosure.

In addition, as there are many public transport vehicles in practical operation, and the public transport vehicles on different lines have different driving routes, before planning the driving timetable, the public transport vehicles to be planned also need to be configured. As shown in FIG. 2, before planning the driving timetable, preliminary work that needs to be completed further includes: a station setting unit 21, configured to set, on an electronic map displayed on the server, a station ID (Identity Document), a name, the number of platforms, and positions corresponding to an entry and an exit for each station of the public transport vehicle, wherein the station ID is a unique identification code of this station for representing a physical location in the whole electronic map.

A route setting unit 22, configured to set, for the public transport vehicle in the up direction and the down direction, a starting station, a terminal station, various stations to pass through in various directions, intersections (drive-in direction and drive-out direction), and speed limit points and speed limit zones on a route, wherein the intersection refers to that when traveling in a specified lane, the public transport vehicle enters the intersection and exits the intersection in a specified direction according to route requirements, and when traveling at the intersection, the public transport vehicle also needs to enter and exit according to a specified channelized lane and a specified speed limit. In addition, in order to improve the traffic efficiency and avoid stop at the intersection, the public transport vehicle also should arrive at the intersection in a green-light period according to a guidance speed of vehicle infrastructure cooperative system, and safely pass.

The above-mentioned lanes refer to the driving channels obtained by dividing a motorway for guiding smooth traffic of vehicle flows in various directions, and different lanes are provided with different numbers. In the embodiments of the present disclosure, the driving route of the public transport vehicle should be set in a specified driving lane, wherein some lines are provided with a dedicated public transport lane. In addition, in order to ensure safety, an intersection speed limit and a speed limit zone are further provided, wherein the intersection speed limit refers to the highest driving speed specified in an interval range for the public transport vehicle from entering the intersection to exiting the intersection; the speed limit zone refers to a special site or interval in a city in which a particular speed limit value range is specified to ensure safety; in addition, it also includes, for the driving safety of the public transport vehicle, special speed restrictions in addition to the urban traffic rules, which are not limited in the embodiments of the present disclosure.

A shift setting unit 23, configured to set line-entering moment, departure moment, shuttle shift (at least one of the starting station and the terminal station is changed), and fast shift (non-stopping at some of the stations in the middle) of the public transport vehicle. In the above, the shift refers to one vehicle running in a certain direction along a certain line at a specified moment.

A vehicle type setting unit 24, configured to set a vehicle type, a vehicle length, or vehicle acceleration/deceleration performance of the public transport vehicle.

An acceleration setting unit 25, configured to set a comfortable acceleration value range of the public transport vehicle in an acceleration process and a deceleration process, and give a recommended value. In the above, a limit value of acceleration range refers to the highest limit value of acceleration absolute value specified when the vehicle is started and stopped (including acceleration and deceleration during driving) in order to ensure driving safety and riding safety and experience of passengers, wherein during the starting and acceleration, the acceleration is a positive value, and during the stop and deceleration, the acceleration is a negative value.

A passenger flow setting unit 26, configured to set the number of passengers, i.e., passenger flow volume, getting on or off at each station for the shift, so as to plan stop duration of the public transport vehicle at this station. In the above, the stop duration refers to the time required for the public transport vehicle from arriving at a certain station where passengers get on or off to leaving the exit of this station, and can be determined for different stations or different shifts of the same station according to the passenger flow of getting on and off, that is, stop duration at a certain station=leaving moment-arrival moment.

A road section average traffic speed setting unit 27, configured to set an average traffic speed of a road section in each period of time. In the above, the road section average traffic speed refers to an average traffic speed of each road section in a corresponding period of time, wherein one road is divided into two or more road sections by taking intersections or speed limit zone mark points as separation points.

Therefore, in addition to multiple stations, the driving route in the embodiments of the present disclosure further includes road sections where the public transport vehicle passes, intersections (including a drive-in direction and a drive-out direction), speed limit zones, and lanes where the public transport vehicle travels, and a planned driving timetable includes the arrival moment when the public transport vehicle arrives at each station in the driving route, leaving moment, stop platform, and stop duration, so that the users can travel reasonably according to the driving timetable, thus improving the users' experience.

Step S104, extracting a driving interval of two adjacent stations in the driving route sequentially in the direction from the starting station to the terminal station.

Specifically, for the multiple stations on the driving route, in the embodiments of the present disclosure, the driving intervals of two adjacent stations in the driving route are sequentially extracted in the direction from the starting station to the terminal station, for example, if a certain driving route has a starting station A and a terminal station B, for multiple stations A, $A_1$, $A_2$ . . . $B_1$, $B_2$, and B in a direction from A to B, driving intervals of multiple adjacent stations such as A to $A_1$, $A_1$-$A_2$ . . . $B_1$-$B_2$, and $B_2$-B are sequentially extracted, so as to determine the driving duration of each driving interval, respectively. Compared with the existing calculation of driving duration of the whole driving route, in the embodiments of the present disclosure, the driving durations are calculated respectively for multiple driving intervals of the driving route, and since the driving conditions of each driving interval are different, the driving duration calculated in the embodiments of the present disclosure is closer to reality, thus better meeting the users' travel requirements.

Step S106, determining, for each driving interval, a driving duration of the public transport vehicle passing through the driving interval according to the attribute of the driving interval.

Specifically, for each driving interval, the interval attributes are different, if the driving duration of each driving interval is obtained according to the same driving interval distance and average line speed of the vehicle, it may result in a relatively large error in the driving durations of some driving intervals, therefore, for each driving interval, the driving duration for the public transport vehicle to pass through the driving interval further needs to be determined according to the interval attribute thereof, so that the planned driving timetable is more reasonable, thus providing better travel service to people. It should be noted that, as the interval attribute of each driving interval is also related to a period of time, for example, the same driving interval has different average traffic speeds in the morning, midday, and evening, the driving duration in the same driving interval is different for different departure moments of the public transport vehicle. In practical application, the driving duration of each driving interval corresponding to the departure moment further needs to be calculated according to the departure moment of the public transport vehicle, thus the accuracy of the driving timetable is improved.

Step S108, calculating, on the basis of a preset departure moment of the public transport vehicle and the driving duration of each driving interval corresponding to the departure moment, time information about the public transport vehicle arriving at each station in the driving route corresponding to the departure moment.

After the driving duration of each driving interval is determined in the above, as the same public transport vehicle may have different departure moments on the same driving route, time information about the public transport vehicle arriving at each station in the driving route corresponding to the departure moment further needs to be calculated on the basis of the preset departure moment of the public transport vehicle to be planned and the driving duration of each driving interval corresponding to the departure moment, thus accuracy of the driving timetable is improved, so that the users make better plans to travel according to the driving timetable of different departure moments.

Step S110, generating the driving timetable corresponding to the departure moment of the public transport vehicle on the current driving route according to the time information.

For the above driving timetable generation method, firstly, the preset driving route of the public transport vehicle is acquired, wherein the driving route includes multiple stations; the driving intervals between two adjacent stations in the driving route are sequentially extracted in the direction from the starting station to the terminal station; then for each driving interval, the driving duration of the public transport vehicle passing through the driving interval is determined according to the attribute of the driving interval; on the basis of the preset departure moment of the public transport vehicle and the driving duration of each driving interval corresponding to the departure moment, the time information about the public transport vehicle arriving at each station in the driving route corresponding to the departure moment is calculated; and finally, the driving timetable corresponding to the departure moment of the public transport vehicle on the current driving route is generated according to the time information. In this way, a complete timetable of all shifts and stations of the public transport vehicle is provided, so as to satisfy the users' travel demands and improve the users' experience.

Figure 3:
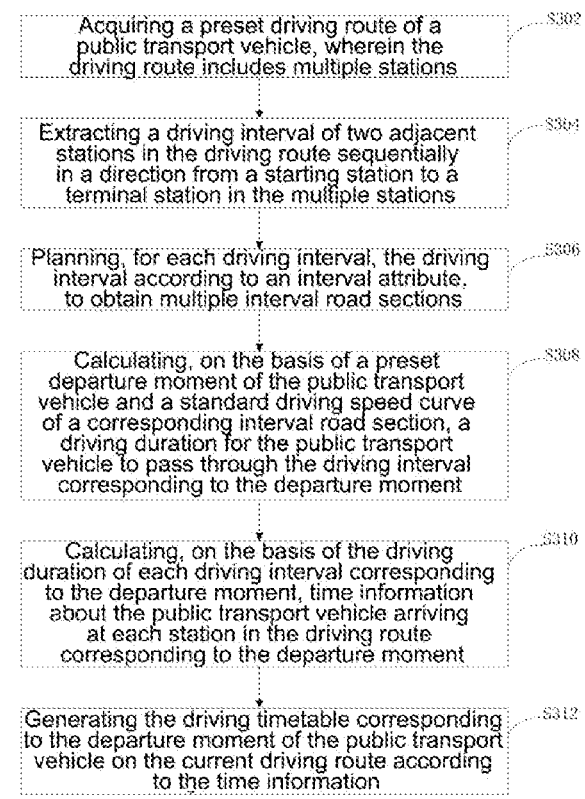
FIG. 3 is a flowchart of another driving timetable generation method provided in an embodiment of the present disclosure.

On the basis of FIG. 1, an embodiment of the present disclosure provides another driving timetable generation method, with a server as the main execution unit, wherein this method mainly describes a process of dividing a driving interval into multiple road sections. As shown in FIG. 3, this method includes the following steps:

Step S302, acquiring a preset driving route of a public transport vehicle, wherein the driving route includes multiple stations.

Step S304, extracting, in a direction from a starting station to a terminal station in the multiple stations, a driving interval of two adjacent stations in the driving route sequentially.

For the above steps S302~S304, reference can be made to the preceding steps S102~S104, and details will not be described herein again in the embodiments of the present disclosure.

Step S306, planning, for each driving interval, the driving interval according to an interval attribute, to obtain multiple interval road sections.

Specifically, the above interval attribute includes intersection information and/or speed limit zone information, and separation points of the driving interval can be determined according to the interval attribute, wherein the separation points include the intersections and/or speed limit zones, so that the driving interval is divided into multiple interval road sections according to the separation points. In this method, a driving route is divided into multiple interval road sections, and each interval road section is provided with a corresponding road section average traffic speed. As the departure moments of public transport vehicles are different, and the same interval also has different road section average traffic speeds at different moments, the road section average traffic speed of the interval road section corresponding to each departure moment also needs to be set according to the departure moment of the public transport vehicle, thus, the error of driving duration of each interval road section is reduced, and further, the driving timetable planned is more reasonable and comprehensive.

Figure 4:
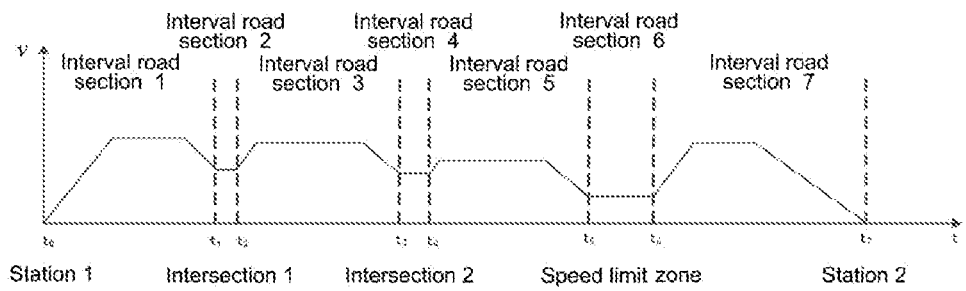
FIG. 4 is a breakdown schematic diagram of an interval road section provided in an embodiment of the present disclosure.

For ease of understanding, the driving interval is used as an example herein for illustration. As is shown in FIG. 4, the driving route from Station 1 to Station 2 is set with three separation points, i.e., Intersection 1, Intersection 2, and a speed limit zone, and the three separation points divide the driving route into seven interval road sections in total, which are numbered from 1 to 7 respectively, wherein Section 1 is a starting point 1—the intersection 1, where the intersection 1 also may be a speed limit point; Section 2 and Section 4 are within Intersection 1 and Intersection 2 respectively; both Section 3 and Section 5 are road sections of intersection/speed limit point-intersection/speed limit point; Section 6 is a speed limit zone road section, and Section 7 is a road section of speed limit point—the station 2, therefore, by setting the separation points, the driving interval between two adjacent stations 1 and 2 is divided into seven interval road sections, and by calculating the driving duration of each interval road section, a driving duration from the station 1 to the station 2 is obtained, which, compared with directly calculating the driving duration from the station 1 to the station 2, reduces the calculation error of the driving duration, and improves the accuracy of the driving timetable. It should be noted that, the above separation points may be set according to actual road conditions, which will not be limited in the embodiments of the present disclosure.

Step S308, calculating, on the basis of a preset departure moment of the public transport vehicle and a standard driving speed curve of corresponding interval road sections, a driving duration for the public transport vehicle to pass through the driving interval corresponding to the departure moment.

Specifically, firstly, an interval road section starting position, an interval road section end position, an interval road section starting speed, an interval road section end speed, an interval road section starting moment, an interval road section acceleration, and an interval road section platform speed are acquired, and the standard driving speed curve of the interval road section is generated, wherein an initial value of the interval road section platform speed is an average traffic speed corresponding to the departure moment; then, on the basis of the standard driving speed curve, the interval road section end moment of each interval road section is calculated; according to the end moment of each interval road section in the current driving interval, time information about the public transport vehicle arriving at an terminal station corresponding to the current driving interval is obtained; and finally, the driving duration for the public transport vehicle to pass through the current driving interval is calculated according to time information about the starting station corresponding to the current driving interval and time information about the terminal station corresponding to the current driving interval, wherein the time information about the starting station corresponding to the current driving interval is time information about the public transport vehicle arriving at the terminal station corresponding to the previous driving interval; by repeating this calculation process, the driving duration of each interval road section in the driving route can be obtained, and further, the driving duration of the entire driving route can be obtained. It should be noted that, the time information about the departure station (the starting station) may be determined according to the line-entering moment and the departure moment of the public transport vehicle.

In one possible embodiment therein, if the separation point in the driving interval is an intersection, the arrival moment when the public transport vehicle arrives at an end point of the interval road section is calculated on the basis of the standard driving speed curve of the above interval road section, wherein the end point of the interval road section is an entry point of the intersection; and whether the arrival moment is within an corresponding intersection green-light period is judged; if so, and the arrival moments of the public transport vehicle and adjacent vehicles satisfy a moment threshold, the arrival moment is taken as the interval road section end moment of the public transport vehicle in the corresponding interval road section; and if not, the arrival moment is adjusted, and the adjusted arrival moment is taken as the interval road section end moment of the public transport vehicle in the corresponding interval road section.

Figure 5:
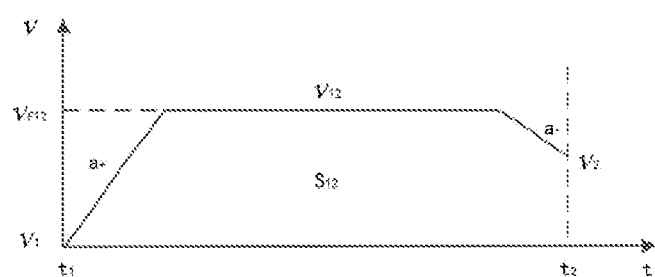
FIG. 5 is a standard driving speed curve of an interval road section provided in an embodiment of the present disclosure.

For ease of understanding, an example is given herein for illustration. For a standard driving speed curve of this interval road section as shown in FIG. 5, the vertical coordinate indicates speed and the horizontal coordinate indicates time, wherein a starting point of the interval road section is a station A, an end point of the interval road section is an entry of an intersection $A_1$, the distance of this interval road section is $S_{12}$, the interval road section starting speed is $v_1$, and the numerical value thereof is 0; the interval road section end speed is $v_2$, where $v_2$ is a known value less than or equal to a value of the intersection speed limit, and for a straight-ahead state and a turning state when entering the intersection, the speed values are set to be different; the interval road section starting moment is $t_1$, and the interval road section acceleration includes a+ and a−, where a+ and a− are comfort acceleration recommendation values during the driving of the public transport vehicle, wherein a+ is set during the acceleration, and a− is set during the deceleration; the interval road section platform speed is $v_2$, wherein the interval road section platform speed $v_{12}$ is a platform speed when a stable speed is achieved after the acceleration process is completed, and it is equal to an interval road section average traffic speed $v_{F12}$ by default, where $v_{F12}$ is a known value. Based on the above standard driving speed curve, the interval road section end moment $t_2$ of the interval road section can be calculated according to the following formula:

$$t_2 = \frac{v_2 - v_{F12}}{a_-} + \frac{s_{12}}{v_{F12}} - \frac{v_{F12}^2 - v_1^2}{2v_{F12}a_+} - \frac{v_2^2 - v_{F12}^2}{2v_{F12}a_-} + \frac{v_{F12} - v_1}{a_+} + t_1 \quad (1)$$

In the above, $t_2$ is the interval road section end moment, $v_2$ is the interval road section end speed, $v_{F12}$ is the interval road section average traffic speed, $v_{12}$ is the platform speed, a+ and a− are the interval road section acceleration, $S_{12}$ is the distance of the interval road section, $v_1$ is the interval road section starting speed, and $t_1$ is the interval road section starting moment.

After the above interval road section end moment $t_2$ is calculated, if the interval road section end moment $t_2$ is within the intersection green-light period, and has no conflict with the arrival moment of the front and rear vehicles in the same lane, specifically represented as follows: the arrival moments of the current public transport vehicle and the adjacent vehicles in the same lane arriving at the same intersection are different, and the difference between the arrival moments of two vehicles is greater than or equal to time headway of the vehicle arriving first, at this time, it is judged that the arrival moments of the current public transport vehicle and the adjacent vehicles satisfy the moment threshold, then the interval road section end moment $t_2$ is taken as the interval road section end moment of the public transport vehicle in this interval road section, and the interval road section end moment is saved as $t_2$, so as to form the driving timetable.

In the above, the above-mentioned time headway is a time length taken by a vehicle to pass through an intersection or a speed limit point, and it is specifically related to the type and length of the public transport vehicle. In practical application, vehicle-head time interval, i.e., time headway, of the public transport vehicle can be calculated according to the type, length, and speed of the public transport vehicle, and a specific calculation method of the time headway can be selected according to actual situations, which is not limited in the embodiments of the present disclosure.

If the above interval road section end moment $t_2$ is within the intersection green-light period, but has conflict with the arrival moment of other adjacent vehicles in the same lane, the interval road section end moment $t_2$ needs to be adjusted, and a specific adjustment process is as follows: within the current green-light cycle, a suitable green-light idle period is selected to satisfy that an arrival moment difference between two adjacent vehicles is greater than or equal to the time headway of the vehicle arriving first, a new interval road section end moment $t_{21}$ is selected, and a new interval road section platform speed $v_{121}$ is calculated, where $v_{121}$ is calculated according to the following formula:

$$v_{121} = v_2 - \frac{2(t_{21} - t_1)a_+a^2 + 2a_-^2(v_1 - v_2) \pm a_-\sqrt{\Delta_1}}{2(a_+a_- - a_-^2)} \quad (2)$$

In the above, $v_{121}$ is the new interval road section platform speed, $t_2$ is the new interval road section end moment, $v_2$ is the interval road section end speed, a+ and a− are the interval road section acceleration, $v_1$ is the interval road section starting moment, $t_1$ is the interval road section starting moment, and $\Delta_1$ represents a first error.

In the above, $\Delta_1$ is calculated according to the following formula:

$$\Delta_1 = 4a_-^2[(t_{21} - t_1)a_+ + v_1 - v_2]^2 - \quad (3)$$
$$4a_-(a_+ - a_-)[2(t_{21} - t_1)a_+v_2 - (v_1 - v_2)^2 - 2a_+s_{12}]$$

In the above, $\Delta_1$ represents the first error, $t_{21}$ is the new interval road section end moment, $v_2$ is the interval road section end speed, a+ and a− are the interval road section acceleration, $v_1$ is the interval road section starting speed, $t_1$ is the interval road section starting moment, and $s_{12}$ is the distance of the interval road section.

According to the above formula (2), two new interval road section platform speeds $v_{121}$ can be calculated, a reasonable numerical value is selected as the final $v_{121}$ according to actual situations, and the final $v_{121}$ and $v_{F12}$ are compared, wherein if the difference between the two is relatively small, then the new interval road section end moment $t_{21}$ and the final $v_{121}$ are taken as the adjusted interval road section end moment $t_{21}$ and the adjusted interval road section platform speed $v_{121}$ of the public transport vehicle in this interval road section; otherwise, if the difference between the two is relatively large, the interval road section starting moment t1 can be adjusted, so that the adjusted $v_{121}$ is close to $v_{F12}$, and new $t_{11}$ is calculated according to the following formula:

$$t_{11} = \frac{v_{121} + a_-t_2 \pm \sqrt{\Delta_2}}{a} - \frac{s_{12}}{v_{121}} + \frac{v_2^2 - v_{121}^2}{2v_{121}a_-} - \frac{v_{121}}{2a_+} \quad (4)$$

In the above, $t_{11}$ is starting moment of the interval road section after adjustment, $S_{12}$ is the distance of the interval road section, $v_2$ is the interval road section end speed, a+ and a− are the interval road section acceleration, $t_2$ is the interval road section end moment, $v_{121}$ is the adjusted interval road section platform speed close to $v_{F12}$, and $\Delta_2$ represents a second error.

In the above, $\Delta_2$ can be calculated by the following formula:

$$\Delta_2 = (v_{121} + a_-t_2)^2 - 2a_-\left(v_{121}t_2 + \frac{a_-t_2^2}{2} - \frac{v_2^2 - v_{121}^2}{2a_-}\right) \quad (5)$$

In the above, $\Delta_2$ represents the second error, $v_2$ is the interval road section end speed, a+ and a− are the interval road section acceleration, $t_2$ is the interval road section end moment, and $v_{121}$ is the adjusted interval road section platform speed close to $v_{F12}$.

In this case, two new interval road section starting moments $t_{11}$ can be calculated according to the above formula (4), and a suitable value is selected as the adjusted interval road section starting moment according to the actual operation conditions. Therefore, through repeated adjustment according to the above formulas (2)-(5), a reasonable adjusted interval road section platform speed $v_{121}$ and an adjusted interval road section starting moment $t_{11}$ can be obtained, so that the public transport vehicle is within the green-light period of the intersection when arriving at the intersection, and has no conflict with the arrival moments of other vehicles, so as to safely pass through the intersection.

In addition, if the interval road section end moment $t_2$ calculated according to the formula (1) is within the red-light period of this intersection, in two adjacent green-light periods, the adjustment can be repeated according to the above formulae (2)-(5) by selecting the closest green-light period and the new interval road section end moment $t_2$ value that has no conflict with the adjacent vehicle, so as to obtain the reasonable adjusted interval road section platform speed $v_{121}$ and the adjusted interval road section starting moment $t_{11}$, and the reasonable adjusted interval road section platform speed $v_{121}$, the adjusted interval road section starting moment $t_{11}$, and the selected interval road section end moment $t_2$ value are recorded in a station timetable or an intersection green-light period arrival timetable, so as to guide each public transport vehicle, and ensure that all public transport vehicles passing through this intersection are within the green-light period of this intersection when passing through this intersection, and the arrival moments of all public transport vehicles do not conflict, so that all public transport vehicles pass through this intersection safely.

In another possible embodiment, if the separation point in the driving interval is a speed limit zone, the arrival moment when the public transport vehicle arrives at the end point of the interval road section is calculated on the basis of the standard driving speed curve of the above interval road section, wherein the end point of the interval road section is an entrance of the speed limit zone; and it is judged whether this arrival moment and the arrival moments of adjacent vehicles satisfy the moment threshold; if so, the arrival moment is taken as the interval road section end moment of the public transport vehicle in the interval road section; and if not, the arrival moment is adjusted, and the adjusted arrival moment is taken as the interval road section end moment of the public transport vehicle in the interval road section.

Specifically, for the case where the separation point is the speed limit zone, when the public transport vehicle arrives at the speed limit point of the speed limit zone, the interval road section end moment is calculated according to the above formula (1), and it is judged whether the arrival moment and the arrival moments of adjacent vehicles satisfy the moment threshold, if so, the interval road section end moment $t_2$ is taken as the interval road section end moment of the public transport vehicle in this interval road section, i.e., the moment when arriving at the speed limit point, and is saved in the speed limit point arrival timetable; otherwise, if the arrival moment and the arrival moments of adjacent vehicles do not satisfy the moment threshold, i.e., conflict occurs, a moment that is close to $t_2$ and is suitable and without conflict is selected as the new interval road section end moment, the new interval road section platform speed of this interval road section is calculated according to the above formula (2), and the finally obtained adjusted interval road section platform speed and the selected new interval road section end moment are taken as the interval road section platform speed and the interval road section end moment of the public transport vehicle in this interval road section, and are saved, so as to be used to plan the driving timetable of the public transport vehicle in this interval road section.

Figure 6:
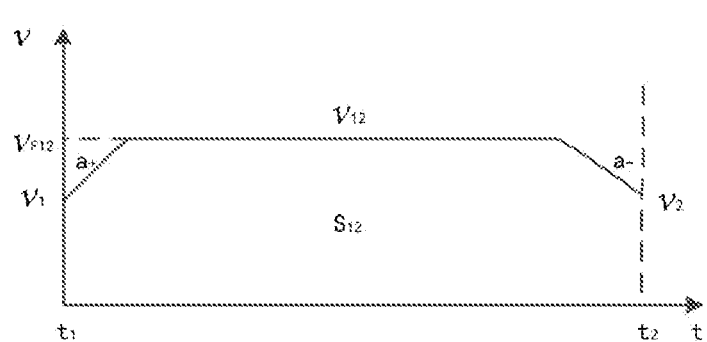
FIG. 6 is a standard driving speed curve of another interval road section provided in an embodiment of the present disclosure.

In another possible embodiment, for the interval road section of intersection/speed limit point-intersection/speed limit point, the standard driving speed curve of this interval road section is as shown in FIG. 6, wherein $t_1$ is corresponding to intersection/speed limit point A, $t_2$ is corresponding to intersection/speed limit point A1, the interval road section acceleration includes a+ and a−, where a+ and a− are comfort acceleration recommendation values during the driving of the public transport vehicle, and it is set as a+ during the acceleration and set as a− during the deceleration; the interval road section starting speed is $v_1$, i.e., an initial speed when driving out of the intersection/speed limit point A, the interval road section end speed is $v_2$, i.e., a speed when arriving at the intersection/speed limit point A1, which is less than or equal to a speed value of a speed limit value of the speed limit zone/intersection, and speed values for straight driving and turning when entering the intersection are different; the distance of the interval road section is $S_{12}$, i.e., the distance from the intersection/speed limit point A to the intersection/speed limit point A1, the interval road section starting moment is $t_1$, i.e., the moment when starting from the intersection/speed limit point A, the interval road section platform speed is $v_{12}$, where the interval road section platform speed $v_{12}$ is the platform speed when a stable speed is achieved after the acceleration process is completed, and is equal to the interval road section average traffic speed $v_{F12}$ by default, where $v_{F12}$ is a known value.

The interval road section end moment $t_2$, i.e., the moment when arriving at the intersection/speed limit point A1, can be calculated according to the above formula (1), at this time, it is judged whether the interval road section end moment $t_2$ is within the intersection green-light period corresponding to the intersection A1, and if it is within the intersection green-light period corresponding to the intersection A1, and has no conflict with the arrival moments of the front vehicle and the rear vehicle in the same lane (the arrival moments of two adjacent vehicles are different, and difference between the arrival moments of the two vehicles is greater than or equal to time headway of the vehicle arriving first), then the interval road section end moment $t_2$ is the final result without the need of adjustment, and is saved in the green-light period arrival timetable corresponding to the intersection A1. Besides, if the public transport vehicle arrives at the intersection A1 in the green-light period, but has conflict with the moments when other vehicles arrive at the intersection, the interval road section end moment $t_2$ needs to be adjusted, and a specific adjustment method is as follows: within the current green-light cycle, a suitable green-light idle period is selected to satisfy that the difference between arrival moments of two adjacent vehicles is greater than or equal to time headway of the vehicle arriving first, a new interval road section end moment $t_2$ is selected, and a new interval road section platform speed $v_{121}$ is calculated according to the above formula (2); if the new interval road section platform speed $v_{121}$ exceeds the speed limit value, the interval road section end moment $t_2$ needs to be re-adjusted, until the new interval road section platform speed $v_{121}$ calculated according to the formula (2) satisfies the requirement.

In addition, if the interval road section end moment $t_2$ is within the red-light period of the intersection A1, in two adjacent green-light periods thereof, the adjustment is made according to the above adjustment method by selecting the closest green-light period and a new interval road section end moment $t_2$ having no conflict with the adjacent vehicles, so as to obtain a reasonable adjusted interval road section platform speed $v_{121}$ and interval road section end moment $t_2$, and the adjusted interval road section end moment $t_2$ is saved in the green-light period arrival timetable of the intersection A1, and the adjusted interval road section platform speed $v_{121}$ and interval road section end moment $t_2$ are saved in vehicle operation parameters of the public transport vehicle, so that the public transport vehicle passes through the intersection A1 safely according to the adjusted interval road section platform speed $v_{121}$ and interval road section end moment $t_2$.

With regard to the case where A1 is the speed limit point, the interval road section end moment $t_2$ when arriving at the speed limit point A1 can be calculated according to the above formula (1), and it is judged whether the interval road section end moment $t_2$ has conflict with other vehicles, and if the interval road section end moment $t_2$ has no conflict with other vehicles, the interval road section end moment $t_2$ is taken as the arrival moment of the public transport vehicle at the speed limit point A1; if the interval road section end moment $t_2$ has conflict with other vehicles, momenta moment near to $t_2$ and having no conflict with other vehicles is selected as the new interval road section end moment, and the new interval road section platform speed $v_{121}$ is calculated according to the above formula (2), so as to obtain a reasonable adjusted interval road section platform speed $v_{121}$ and interval road section end moment $t_2$, and the adjusted interval road section end moment $t_2$ is saved in the arrival timetable of the speed limit point A1, and the adjusted interval road section platform speed $v_{121}$ and interval road section end moment $t_2$ are saved in vehicle operation parameters of the public transport vehicle, so that the public transport vehicle passes through the speed limit point A1 safely according to the adjusted interval road section platform speed $v_{121}$ and interval road section end moment $t_2$.

Figure 7:
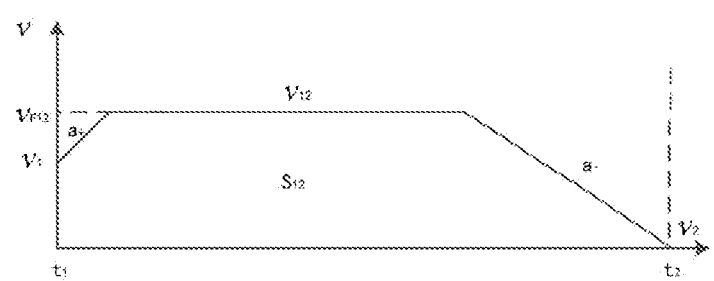
FIG. 7 is a standard driving speed curve of another interval road section provided in an embodiment of the present disclosure.

In another possible embodiment, for the interval road section of intersection/speed limit point-station, the standard driving speed curve of this interval road section is as shown in FIG. 7, wherein $t_1$ is corresponding to intersection/speed limit point A, $t_2$ is corresponding to station A1, the interval road section acceleration includes a+ and a−, where a+ and a− are comfort acceleration recommendation values during the driving of the public transport vehicle, which is set as a+ during the acceleration and set as a− during the deceleration; the interval road section starting speed is $v_1$, i.e., an initial speed when driving out of the intersection/speed limit point A, the interval road section end speed is $v_2$, i.e., a speed when arriving at the station A1, which has a value of 0, the distance of the interval road section is $S_{12}$, i.e., the distance from the intersection/speed limit point A to the station A1, the interval road section starting moment is $t_1$, i.e., the moment when starting from the intersection/speed limit point A, the interval road section platform speed is $v_{12}$, where the interval road section platform speed $v_{12}$ is the platform speed when a stable speed is achieved after the acceleration process is completed, i.e., equal to the interval road section average traffic speed $v_{F12}$ by default, where $v_{F12}$ is a known value.

The interval road section end moment $t_2$, i.e., the moment when arriving at the station A1, can be calculated according to the above formula (1), at this time, it is judged whether the interval road section end moment $t_2$ has conflict with the arrival moments of front vehicle and back vehicle of the same platform in a platform arrival timetable corresponding to the station A1, and if there is no conflict (the arrival moments of two adjacent vehicles are different, and difference between the arrival moments of the two vehicles is greater than or equal to time headway of the vehicle arriving first), the interval road section end moment $t_2$ is the final result, without the need of adjustment, and is saved in the platform arrival timetable corresponding to the station A1. Besides, if there are conflicts with other vehicles, the interval road section end moment $t_2$ needs to be adjusted, and a specific adjustment method is as follows: a suitable idle period is selected, near the arrival moments when the adjacent vehicles arrive at the station A1, to satisfy that the difference between arrival moments of two adjacent vehicles is greater than or equal to stop duration of the vehicle arriving first, a new interval road section end moment 42 value is selected, and a new interval road section platform speed $v_{121}$ is calculated according to the above formula (2), if the new interval road section platform speed $v_{121}$ exceeds the speed limit value, the interval road section end moment $t_2$ needs to be re-adjusted, until the new interval road section platform speed $v_{121}$ calculated according to the formula (2) satisfies the requirement.

Finally, the satisfactory interval road section end moment $t_2$ corresponding to the interval road section platform speed $v_{121}$ is recorded in the platform arrival timetable of the station A1, and the satisfactory interval road section platform speed $v_{121}$ and the corresponding interval road section end moment $t_2$ are saved in the vehicle operation parameters of the public transport vehicle, so that the public transport vehicle arrives at the station A1 safely according to the satisfactory interval road section platform speed $v_{121}$ and the corresponding interval road section end moment $t_2$.

Figure 8:
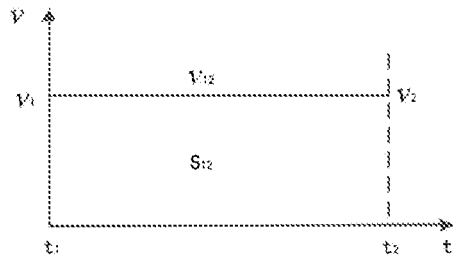
FIG. 8 is a standard driving speed curve of another interval road section provided in an embodiment of the present disclosure.

In another possible embodiment, the interval road section within an intersection/speed limit zone can be regarded as a constant-speed driving process, and the standard driving speed curve of this interval road section is shown in FIG. 8, where $t_1$ is corresponding to the intersection/speed limit point A, $t_2$ is corresponding to the intersection/speed limit point A1, the interval road section starting speed is $v_1$, i.e., an initial speed when entering the intersection/speed limit point A, the interval road section end speed is $v_2$, i.e., the speed when driving out of the intersection/speed limit point A1, the distance of the interval road section is $S_{12}$, i.e., the distance from the intersection/speed limit point A to the intersection/speed limit point A1, the interval road section platform speed is $v_{12}$, i.e., the platform speed value within a speed limit range in the intersection/speed limit zone, and, $v_{12}=v_1=v_2$, the interval road section starting moment is $t_1$, i.e., the moment when starting from the intersection/speed limit point A, then the interval road section end moment $t_2$ can be calculated according to the following formula:

$$t_2 = \frac{s_{12}}{v_{12}} \qquad (6)$$

In the above, $t_2$ represents the interval road section end moment in the intersection/speed limit zone, $S_{12}$ represents the distance of the interval road section in the intersection/speed limit zone, and $v_{12}$ represents the interval road section platform speed within the intersection/speed limit zone. It should be noted that, at this time, if the interval road section end moment $t_2$ needs to be adjusted, a reasonable interval road section end moment $t_2$ can be obtained by adjusting the interval road section platform speed $v_{12}$.

In another possible embodiment, for each station, the method further includes: calculating and adjusting a stop duration. Specifically, the stop duration of the public transport vehicle is determined according to input passenger flow volume data and correlation and empirical formula of historical passenger flow volume and stop duration. In this process, not only the number of passengers needs to be considered, but also other features of passenger flow need to be considered, for example, the stop duration needs to be adjusted appropriately near a school, a hospital, a railway station, and an airport; in addition, the condition of the station should also be considered, for example, if the number of vehicles arriving at a certain station per unit time is relatively large, the stop duration should be appropriately adjusted; moreover, the condition of transfer at the same station and transfer at adjacent stations also should be considered, and the stop duration should be appropriately adjusted at the transfer station. The specific stop duration at each station can be calculated and adjusted according to actual situations, which is not limited in the embodiments of the present disclosure.

After the stop duration of the above station is acquired, the departure moment when the public transport vehicle leaves this station can be obtained according to station departure moment=station arrival moment+stop duration. In particular, at the departure station, the departure moment is equal to the line-entering moment plus stop duration.

Therefore, the driving interval is divided into multiple interval road sections by the separation points, and the driving duration of each interval road section is respectively obtained, the divided interval road sections are in turn combined one by one. In the combining process, it should be ensured that the positions, moments, and speeds of start and end points of each interval road section are connected end to end, and the green-light period arrival timetable, speed limit point arrival timetable, platform arrival timetable, and vehicle operation parameter table, etc. of the corresponding driving interval are generated.

Besides, for each driving interval, the arrival moment when the public transport vehicle arrives at the terminal station corresponding to the current driving interval can be obtained by combining the end moment of each interval road section in the current driving interval one by one; and it is judged whether the arrival moment and arrival moments of adjacent vehicles at the terminal station corresponding to the current driving interval satisfy the moment threshold, and if so, i.e., the arrival moments of the two adjacent vehicles at the terminal station are not the same, and the difference between the arrival moments of the two vehicles is greater than or equal to time headway of the vehicle arriving first, the arrival moment is taken as the time information about the public transport vehicle arriving at the terminal station corresponding to the current driving interval; if not, the arrival moment is adjusted, and the adjusted arrival moment is taken as the time information about the public transport vehicle arriving at the terminal station corresponding to the current driving interval, wherein an adjustment method of the arrival moment may refer to the preceding adjustment method of the station, which will not be repeated in detail in the embodiments of the present disclosure.

Step S310, calculating, on the basis of the driving duration of each driving interval corresponding to the departure moment, time information about the public transport vehicle arriving at each station in the driving route corresponding to the departure moment.

Specifically, according to the arrival moment of the terminal station of each driving interval corresponding to the departure moment obtained in the above, the time information about the public transport vehicle arriving at each station corresponding to the departure moment can be obtained, thus a driving timetable of the public transport vehicle corresponding to the departure moment is generated. With regard to the remaining departure moments of the public transport vehicle, by repeating the above process, the driving timetable corresponding to different departure moments can be obtained, thus a general driving timetable of the public transport vehicle is generated, so that the users get the moment information about the public transport vehicle arriving at each station in the driving route according to the driving timetable, so as to reasonably arrange the travel, further improving the users' experience. It should be noted that, the timetable of each station in the general driving timetable herein includes all moments when the public transport vehicle arrives at each station within one day (00:00~24:00).

Step S312, generating, according to the time information, the driving timetable corresponding to the departure moment of the public transport vehicle on the current driving route.

In the above driving timetable generation method, the driving interval is divided into multiple interval road sections by providing the separation points, and the end moment of the interval road section is calculated for each interval road section according to the actual situation, and are combined one by one, so as to obtain the driving duration of each driving interval, which is in turn combined with the departure moments of the public transport vehicle, so that the driving timetable of the public transport vehicle can be obtained, thus, the calculation error of the driving duration of each driving interval is reduced, so that the driving timetable obtained is more reasonable, moreover, in the manner of dividing the driving route into multiple interval road sections by providing the separation points, compared with the existing manner focusing only on the entire driving route, the driving timetable obtained in the embodiments of the present disclosure is more comprehensive.

In another possible embodiment, the method further includes: generating the vehicle operation parameters of the public transport vehicle based on the driving timetable, and sending the vehicle operation parameters to the public transport vehicle, so that the public transport vehicle travels in accordance with the vehicle operation parameters. Specifically, the driving timetable includes: line timetable, shift timetable, platform arrival/departure timetable, intersection green-light period arrival timetable, and speed limit point arrival timetable, and the vehicle operation parameters of the public transport vehicle are generated according to the driving timetable, wherein the vehicle operation parameters include: driving line, line-entering time, departure time, vehicle acceleration, interval road section average traffic speed, platform speed, time headway, green-light period arrival timetable of intersections to be passed through, speed limit point arrival timetable of speed limit zones to be passed through, station arrival timetable or station stop durations and other parameters, so that the public transport vehicle can travel in accordance with the vehicle operation parameters, safely pass through each intersection in the driving route within the green-light period of each intersection, and safely pass through each speed limit zone in the driving route.

In another possible embodiment, the method further includes: simulating the driving timetable in accordance with a preset mode, so as to improve the driving timetable, wherein the preset mode is a time mode. Specifically, the operation is simulated in accordance with the vehicle operation parameters of the public transport vehicle in a visual manner through computer modeling, and the simulation is carried out in accordance with the time mode, that is, the simulation is carried out in a chronological order during the simulation process, wherein all the public transport vehicles are simulated and displayed in the form of vehicle icons, and at every moment in the simulated operation process, the vehicle icons should correspond to positions where they are located, and directions and speed values thereof are displayed; on the road, intersections and speed limit information should be displayed, wherein for the intersections, light color and countdown of signal lights should be displayed in real time; and when the vehicle is stopped at a station, stop countdown should be displayed. In addition, in the simulation process, if an alarm occurs, the color of the vehicle icon is changed to prompt so that the staff can find the problem in time.

Optionally, the above simulation process can display the corresponding arrival timetable at intersections, speed limit points or stations, and the simulation is carried out according to different graphical simulation methods, for example, simulating in a manner of schematic diagram of driving route, simulating according to the GIS (Geographic Information System) map, etc.; or, the simulation is carried out according to the driving route or shift, for example, simulating a single shift or multiple shifts for the same driving route, simulating multiple shifts for different driving routes; or, the simulation is carried out according to the stations, for example: simulating entry, exit and stop conditions at each station in different time periods, etc.; or, the simulation is carried out according to areas and roads, for example, all routes and shifts for different roads and different areas can be simulated; and the simulation is carried out according to standard conditions and disturbance conditions, wherein the standard condition simulation is based on input conditions and results calculated according to the input conditions, and the disturbance condition simulation is based on a certain proportion of increase or decrease of the data of the input conditions, so as to determine the robustness of the driving timetable, in addition, a suitable simulation mode also can be selected according to the actual situation for the simulation. The specific simulation mode herein is not limited in the embodiments of the present disclosure.

In addition, in the above simulation process, if a certain public transport vehicle arrives early or late, and has conflict with other vehicles in the arrival moment and the stop duration, it is necessary to alarm in time and record relevant information, so that the staff can improve and optimize the driving timetable of this public transport vehicle according to the relevant information. Specifically, according to the simulation result, the driving timetable and the vehicle operation parameters are evaluated according to preset conditions, and if the requirements of preset conditions cannot be met, optimization should be carried out according to the above alarm data and alarm information, and simulated operation and evaluation are re-carried out until the requirements of the preset conditions are met, so that the optimized driving timetable is more complete and reasonable, so as to better serve people's travel.

Figure 9:
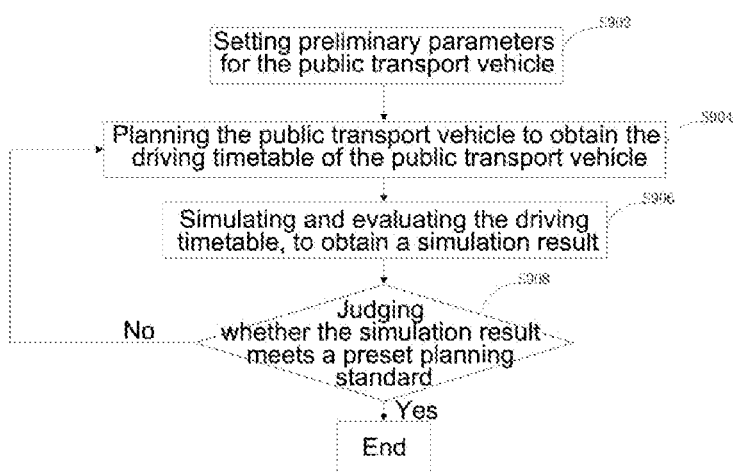
FIG. 9 is a flowchart of another driving timetable generation method provided in an embodiment of the present disclosure.

For ease of understanding, an example is given herein for illustration. As is shown in FIG. 9, the following steps are included:

Step S902, setting preliminary parameters for the public transport vehicle;

Specifically, the driving timetable mainly includes arrival moment, leaving moment, stop station, and stop duration when the public transport vehicle arrives at each station in the driving route. As there are many public transport vehicles in practical operation, and each public transport vehicle has a different driving route, before planning the driving timetable, the public transport vehicle to be planned needs to be set. For specific preliminary parameter setting, reference can be made to the preceding embodiments, which is not repeated in detail herein in the embodiments of the present disclosure.

Step S904, planning the public transport vehicle to obtain the driving timetable of the public transport vehicle.

For the above process of planning the driving timetable, reference can be made to the preceding embodiments, which is not repeated in detail herein in the embodiments of the present disclosure.

Step S906, simulating and evaluating the driving timetable to obtain a simulation result.

In the above, for the above simulation and evaluation process, reference can be made to the preceding embodiments, which is not repeated in detail herein in the embodiments of the present disclosure.

Step S908, judging whether the simulation result meets a preset planning standard; if not, re-performing steps S904~S908 until a driving timetable that meets the preset planning standard is obtained; if so, ending the above planning procedure of driving timetable, and taking the final driving timetable that meets the preset planning standard as the driving timetable of the public transport vehicle, so as to better serve people's travel and improve the users' experience.

The driving timetable generation method provided in the embodiments of the present disclosure not only is applicable to public transport vehicles, but also can be used for other means of transportation, which is not limited in the embodiments of the present disclosure. In addition, in the planning process of the driving timetable, the interval road section average traffic speed is introduced as the platform speed so as to improve the feasibility and safety of the driving timetable; the intersection green-light period arrival timetable is introduced so that the vehicle can, in the driving process, arrive at the intersection at a steady speed and pass it safely in order during the green-light period; the speed limit point arrival timetable is introduced so that the vehicle can arrive at the speed limit point at a steady speed and pass it safely in order during the driving process, thus ensuring the timeliness and accuracy of the driving timetable, and further avoiding influence on the users' travel due to inconsistency between the moment when the public transport vehicle arrives at the station and the moment corresponding to the driving timetable.

In addition, when planning the driving interval, the speed limit zone is also taken into consideration so as to ensure the safety of the public transport vehicle; when the intersection is passed through, the coordination of traffic and road is considered to avoid stop at the intersection; meanwhile, the problem of multiple vehicles arriving at the intersection at the same time is taken into account, so that multiple public transport vehicles arriving at different intersections in different lanes can pass safely in order according to the intersection timetable; at the station, it is realized that the public transport vehicle enters the station according to the designated station or the designated platform, and avoids conflict with other vehicles; and in each interval road section, taking the different average traffic speeds in each interval road section into account, even if the public transport vehicle is traveling in the dedicated public transport lane, the public transport vehicle should also maintain the same speed as the traffic flow, therefore, for each interval road section, the driving route average traffic speed and the interval road section average traffic speed are also considered; finally, the driving timetable is simulated and evaluated so as to be improved and optimized, while most of the existing compilation methods are continuously improved and optimized when problems arise in actual operation, therefore, compared with the existing compilation methods, the present disclosure completes the planning of the public transport timetable through station setting, line setting, shift setting, interval setting, and integrating the whole process into a complete procedure, and then a complete timetable for all shifts and stations of public transport vehicles is generated through simulation and evaluation and re-optimization for vehicle scheduling and user travel, which facilitates the optimal allocation, accurate control, and punctual management of vehicle resources, facilitates the users in travelling according to the driving timetable, and improves the users' experience.

Figure 10:
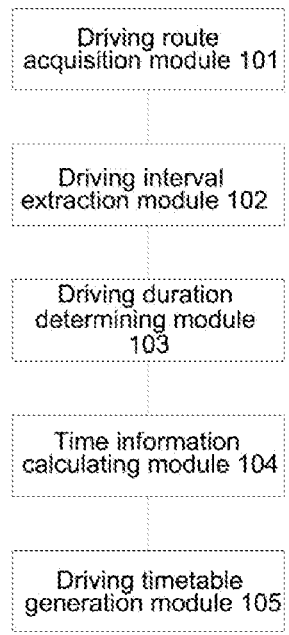
FIG. 10 is a schematic diagram of a driving timetable generation apparatus provided in an embodiment of the present disclosure.

Corresponding to the above method embodiments, an embodiment of the present disclosure further provides a driving timetable generation apparatus, and as shown in FIG. 10, the apparatus includes a driving route acquisition module 101, a driving interval extraction module 102, a driving duration determining module 103, a time information calculating module 104, and a driving timetable generation module 105 connected in sequence. Among them, functions of each module are as follow:

the driving route acquisition module 101 is configured to acquire a preset driving route of a public transport vehicle, wherein the driving route includes multiple stations;

the driving interval extraction module 102 is configured to extract sequentially, in the direction from the starting station to the terminal station in the multiple stations, driving intervals of every two adjacent stations in the driving route;

the driving duration determining module 103 is configured to determine, for each driving interval, a driving duration of the public transport vehicle passing through the driving interval according to the attribute of the driving interval;

the time information calculating module 104 is configured to calculate, on the basis of a preset departure moment of the public transport vehicle and the driving duration of each driving interval corresponding to the departure moment, time information about the public transport vehicle arriving at each station in the driving route corresponding to the departure moment; and the driving timetable generation module 105 is configured to generate, according to the time information, the driving timetable corresponding to the departure moment of the public transport vehicle on the current driving route.

For the driving timetable generation apparatus provided in the embodiment of the present disclosure, the preset driving route of the public transport vehicle is acquired, wherein the driving route includes multiple stations; the driving intervals of two adjacent stations in the driving route is sequentially extracted in the direction from the starting station to the terminal station in the multiple stations; for each driving interval, the driving duration of the public transport vehicle passing through the driving interval is determined according to the interval attribute of the driving interval; on the basis of the preset departure moment of the public transport vehicle and the driving duration of each driving interval corresponding to the departure moment, the time information about the public transport vehicle arriving at each station in the driving route corresponding to the departure moment is calculated; and the driving timetable corresponding to the departure moment of the public transport vehicle on the current driving route is generated according to the time information. In this way, a complete timetable of all shifts and stations of the public transport vehicle is provided, so as to satisfy the users' travel demands and improve the users' experience.

Further, the above driving duration determining module 103 is further configured to plan the driving interval according to an interval attribute, so as to obtain multiple interval road sections; and calculate, on the basis of a standard driving speed curve of the interval road section, a driving duration of the public transport vehicle passing through the driving interval.

Further, the above interval attribute includes intersection information and/or speed limit zone information, and the above driving duration determining module 103 is further configured to determine the separation points of the driving interval according to the interval attribute, wherein the separation points include intersections and/or speed limit zones; and divide the driving interval into multiple interval road sections according to the separation points.

Further, the above driving duration determining module 103 is further configured to: acquire an interval road section starting position, an interval road section end position, an interval road section starting speed, an interval road section end speed, an interval road section starting moment, an interval road section acceleration and an interval road section platform speed, and generate the standard driving speed curve of the interval road section, wherein an initial value of the interval road section platform speed is the average traffic speed; calculate, on the basis of the standard driving speed curve, the interval road section end moment of each interval road section; according to the end moment of each interval road section in the current driving interval, obtain time information about the public transport vehicle arriving at an terminal station corresponding to the current driving interval; and calculate the driving duration for the public transport vehicle to pass through the current driving interval according to time information about the starting station corresponding to the current driving interval and time information about the terminal station corresponding to the current driving interval, wherein the time information about the starting station corresponding to the current driving interval is time information about the public transport vehicle arriving at the terminal station corresponding to the previous driving interval.

Further, when the separation point is an intersection, the above driving duration determining module 103 is further configured to: calculate, on the basis of the standard driving speed curve of the interval road section, the arrival moment when the public transport vehicle arrives at an end point of the interval road section, wherein the end point of the interval road section is an entry point of the intersection; and judge whether the arrival moment is within an intersection green-light period corresponding to the intersection; if so, and the arrival moments of the public transport vehicle and adjacent vehicles satisfy the moment threshold, take the arrival moment as the interval road section end moment of the public transport vehicle in the corresponding interval road section; and if not, adjust the arrival moment, and take the adjusted the arrival moment as the interval road section end moment of the public transport vehicle in the corresponding interval road section.

Further, when the separation point is a speed limit zone, the above driving duration determining module 103 is further configured to: calculate the arrival moment when the public transport vehicle arrives at the end point of the interval road section on the basis of the standard driving speed curve of the interval road section, wherein the end point of the interval road section is an entrance of the speed limit zone; and judge whether the arrival moment and arrival moments of adjacent vehicles satisfy the moment threshold; if so, take the arrival moment as the interval road section end moment of the public transport vehicle in the interval road section; and if not, adjust the arrival moment, and take the adjusted arrival moment as the interval road section end moment of the public transport vehicle in the interval road section.

Further, the above driving duration determining module 103 is further configured to: obtain the arrival moment when the public transport vehicle arrives at the terminal station corresponding to the current driving interval according to the end moment of each interval road section in the current driving interval; and judge whether the arrival moment and arrival moments of adjacent vehicles at the terminal station corresponding to the current driving interval satisfy the moment threshold, and if so, take the arrival moment as the time information about the public transport vehicle arriving at the terminal station corresponding to the current driving interval; if not, adjust the arrival moment, and take the adjusted arrival moment as the time information about the public transport vehicle arriving at the terminal station corresponding to the current driving interval.

Further, the above apparatus is further configured to: generate the vehicle operation parameters of the public transport vehicle based on the driving timetable, and send the vehicle operation parameters to the public transport vehicle, so that the public transport vehicle travels in accordance with the vehicle operation parameters.

Further, the above apparatus is further configured to: simulate the driving timetable in accordance with a preset mode, so as to perfect the driving timetable, wherein the preset mode is a time mode.

Figure 11:
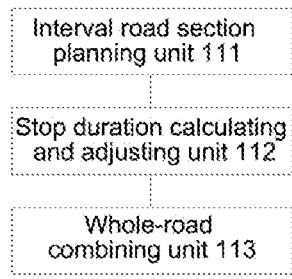
FIG. 11 is a schematic diagram of driving timetable planning provided in an embodiment of the present disclosure.

In addition, in one of the possible embodiments, as shown in FIG. 11, the above driving duration determining module 103 further includes: an interval road section planning unit 111, a stop duration calculating and adjusting unit 112, and a whole-road combining unit 113, wherein the interval road section planning unit 111 is configured to divide the driving interval into multiple interval road sections through the separation points; the stop duration calculating and adjusting unit 112 is configured to calculate and adjust the stop duration of the public transport vehicles at each station in the driving route; the whole-road combining unit 113 is configured to combine multiple interval road sections by connecting them end to end, so as to obtain the driving duration of the whole driving route. For specific functions of the interval road section planning unit 111, the stop duration calculating and adjusting unit 112, and the whole-road combining unit 113, reference can be made to the preceding method embodiments, which will not be repeated in detail again in the embodiments of the present disclosure.

Figure 12:
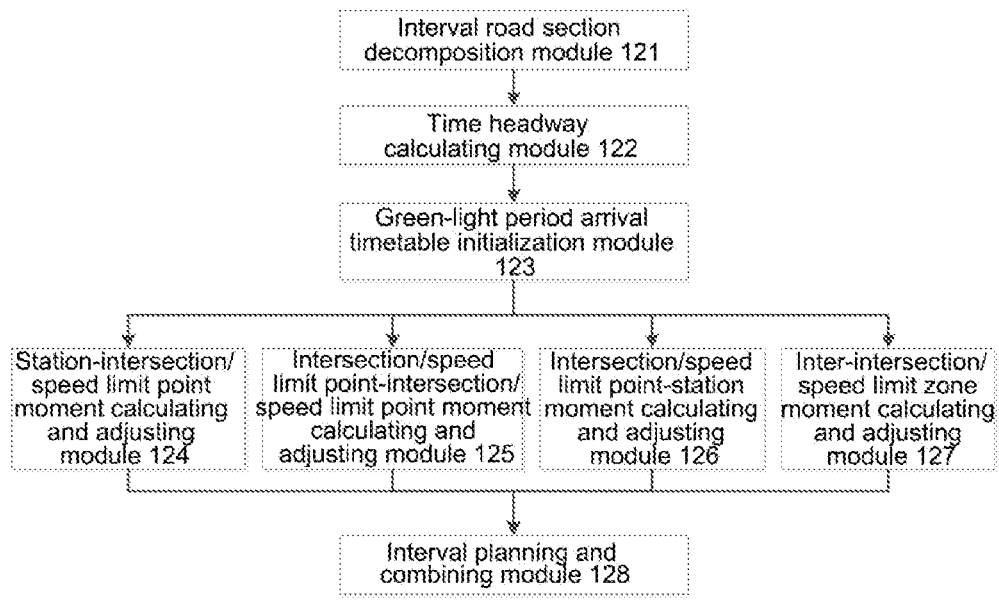
FIG. 12 is a schematic diagram of another driving timetable generation apparatus provided in an embodiment of the present disclosure.

For ease of understanding, an example is given herein for illustration, and as shown in FIG. 12, the apparatus includes: an interval road section breakdown module 121, a time headway calculating module 122, a green-light period arrival timetable initialization module 123, a station-intersection/speed limit point moment calculating and adjusting module 124, an intersection/speed limit point-intersection/speed limit point moment calculating and adjusting module 125, an intersection/speed limit point-station moment calculating and adjusting module 126, an inter-intersection/speed limit zone moment calculating and adjusting module 127, and an interval planning and combining module 128, wherein the green-light period arrival timetable initialization module 123 is configured to acquire light time information about intersection to be passed through, and obtain corresponding green light starting time and green light duration of each cycle according to phase corresponding to a driving direction of a shift, and accordingly initialize the intersection green light duration arrival timetable, including shift, moment of arriving at the intersection, and moment of leaving the intersection; in addition, for specific functions of each of the above modules, reference can be made to the preceding method embodiments, which will not be repeated in detail again in the embodiments of the present disclosure.

The driving timetable generation apparatus provided in the embodiments of the present disclosure has the same technical features as the driving timetable generation method provided in the above embodiments, and therefore also can solve the same technical problem, and achieve the same technical effects.

The present embodiment further provides an electronic device, including a processor and a memory, wherein the memory stores machine-executable instructions that can be executed by the processor, and the processor executes the machine-executable instructions so as to implement the above driving timetable generation method.

Figure 13:
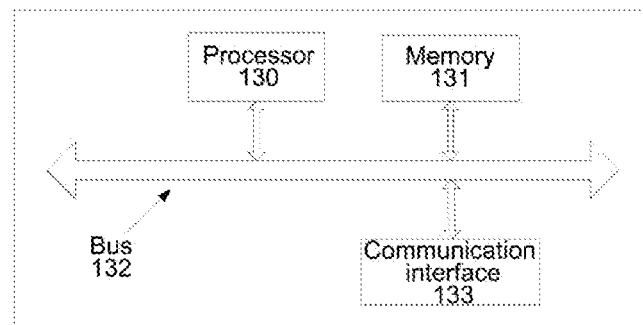
FIG. 13 is a schematic diagram of an electronic device provided in an embodiment of the present disclosure.

Referring to what is shown in FIG. 13, the electronic device includes a processor 130 and a memory 131, wherein the memory 131 stores machine-executable instructions that can be executed by the processor 130, and the processor 130 executes the machine-executable instructions so as to implement the above driving timetable generation method.

Further, the electronic devices shown in FIG. 13 further include a bus 132 and a communication interface 133, and the processor 130, the communication interface 133, and the memory 131 are connected via the bus 132.

In the above, the memory 131 may include RAM (Random Access Memory), and may also include a non-volatile memory, such as at least one disk memory. Communication connection between this system network element and at least one other network element is achieved through at least one communication interface 133 (wired or wireless), and Internet, Wide Area Network, local network, Metropolitan Area Network and so on may be used. The bus 132 can be an ISA (Industrial Standard Architecture) bus, PCI (Peripheral Component Interconnection) bus or EISA (Enhanced Industry Standard Architecture) bus and so on. The bus may be an address bus, a data bus, a control bus and so on. For ease of representation, the bus is represented merely with one two-way arrow in FIG. 13, but it does not mean that there is only one bus or one type of bus.

The processor 130 may be an integrated circuit chip with signal processing capabilities. In an implementation process, various steps of the above method may be completed by an integrated logic circuit of hardware in the processor 130 or instructions in a software form. The above processor 130 may be a general-purpose processor, including Central Processing Unit (CPU for short), Network Processor (NP for short), etc., and also may be a Digital Signal Processor (DSP for short), an Application Specific Integrated Circuit (ASIC for short), a Field-Programmable Gate Array (FPGA for short) or other programmable logic devices, discrete gates, transistor logic devices, or discrete hardware components that can realize or implement various methods, steps, and logic blocks disclosed in the embodiments of the present disclosure. The general-purpose processor may be a microprocessor or any conventional processor. The steps in the method disclosed in combination with the embodiments of the present disclosure may be directly reflected in being completed by hardware decoding processor, or carried out and completed by combining hardware and software modules in the decoding processor. The software module may be located in a developed storage medium in the art such as a random access memory, a flash memory, a read-only memory, a programmable read-only memory or an electrically erasable programmable memory, or register. The storage medium is located in the memory 131, and the processor 130 reads information in the memory 131, and is combined with hardware thereof to complete the steps of the method of the preceding embodiments.

The present embodiment further provides a machine-readable storage medium, which stores machine-executable instructions, and when the machine-executable instructions are called and executed by a processor, the machine-executable instructions cause the processor to implement the above driving timetable generation method.

The computer program products of the driving timetable generation apparatus and electronic devices provided in the embodiments of the present disclosure include a computer-readable storage medium in which a program code is stored, and instructions included in the program code can be used to execute the methods described in the preceding embodiments. Reference can be made to the method embodiments for specific implementation, which will not be repeated herein.

A person skilled in the art could clearly know that for the sake of convenient and concise description, reference can be made to corresponding processes in the preceding method embodiments for specific operation processes of the system and apparatus described above, which will not be repeated herein.

In addition, in the description of the embodiments of the present disclosure, unless otherwise specified and defined explicitly, the terms "mount", "join", or "connect" should be construed in a broad sense, for example, a connection can be a fixed connection, a detachable connection, or an integrated connection; it can be a mechanical connection, and also can be an electrical connection; it can be a direct connection, an indirect connection through an intermediate media, or an inner communication between two elements. The specific meanings of the above-mentioned terms in the present disclosure could be understood by a person ordinarily skilled in the art according to specific situations.

If the function is realized in a form of software functional unit and is sold or used as an individual product, it may be stored in one non-volatile computer-readable storage medium executable by a processor. Based on such understanding, the essence of the technical solutions of the present disclosure or the parts that make contribution to the prior art thereof may be embodied in form of a software product, and the computer software product is stored in a storage medium, including several instructions for making one computer device (which can be a personal computer, a server or a network device etc.) execute all or part of the steps of the methods of various embodiments of the present disclosure. The aforementioned storage medium includes various media in which program codes can be stored, such as USB disks, mobile hard drives, read-only memory (ROM), random access memory (RAM), diskette and compact disks.

In the description of the present disclosure, it is to be noted that orientation or positional relations indicated by terms such as "center", "upper", "lower", "left", "right", "vertical", "horizontal", "inner" or "outer" are the orientation or positional relations shown based on the drawings, which are only for facilitating in describing the present disclosure and simplifying the description, rather than indicating or implying that the referred devices or elements must be in a particular orientation or constructed or operated in the particular orientation, and therefore should not be construed as limiting the present disclosure. Besides, the term "first", "second", or "third" is merely for descriptive purpose, but should not be construed as indicating or implying importance in the relativity.

Finally, it should be noted that the above embodiments are merely specific embodiments of the present disclosure, for illustrating the technical solutions of the present disclosure, rather than limiting the present disclosure, and the scope of protection of the present disclosure should not be limited thereto. While the detailed description is made to illustrate the present disclosure with reference to the preceding embodiments, those ordinarily skilled in the art should understand that within the technical scope disclosed in the present disclosure, any skilled person familiar with the present technical field still could make modifications or readily conceive changes for the technical solutions described in the preceding embodiments, or make equivalent substitutions to some of the technical features therein; these modifications, changes, or substitutions do not make the essence of the corresponding technical solutions depart from the spirit and scope of the technical solutions of the embodiments of the present disclosure, and they all should be covered within the scope of protection of the present disclosure. Therefore, the scope of protection of the present disclosure should be determined by the scope of protection of the claims.

What is claimed is:

1. A driving timetable generation method, comprising steps of:
   acquiring a preset driving route of a public transport vehicle, wherein the driving route comprises multiple stations;
   extracting, in a direction from a starting station to a terminal station in the multiple stations, driving intervals of two adjacent stations in the driving route sequentially;
   determining, for each driving interval, a driving duration for the public transport vehicle to pass through the driving interval according to interval attribute of the driving interval;
   calculating, on the basis of a preset departure moment of the public transport vehicle and the driving duration of each of the driving intervals corresponding to the departure moment, time information about the public transport vehicle arriving at each of the stations in the driving route corresponding to the departure moment; and
   generating, according to the time information, the driving timetable corresponding to the departure moment of the public transport vehicle on the current driving route;
   wherein the step of determining a driving duration for the public transport vehicle to pass through the driving interval according to an interval attribute of the driving interval comprises:
   planning the driving interval according to the interval attribute, so as to obtain multiple interval road sections; and
   calculating, on the basis of a standard driving speed curve of the interval road section, a driving duration for the public transport vehicle to pass through the driving interval;
   wherein the interval attribute comprises intersection information and/or speed limit zone information; and the step of planning the driving interval according to the interval attribute comprises:
   determining separation points of the driving interval according to the interval attribute, wherein the separation points comprise intersections and/or speed limit zones; and
   dividing the driving interval into multiple interval road sections according to the separation points;
   wherein the step of calculating, on the basis of a standard driving speed curve of the interval road sections, a driving duration for the public transport vehicle to pass through the driving interval comprises:
   acquiring starting position, end position, starting speed, end speed, starting moment, acceleration, and platform speed of interval road sections, and generating the standard driving speed curve of the interval road sections, wherein an initial value of the interval road section platform speed is an average traffic speed;
   calculating, on the basis of the standard driving speed curve, an interval road section end moment of each of the interval road sections;
   obtaining, according to an end moment of each interval road section in a current driving interval, time information about the public transport vehicle arriving at the terminal station corresponding to the current driving interval; and
   calculating, according to the time information about the starting station corresponding to the current driving interval and time information about the terminal station corresponding to the current driving interval, the driving duration for the public transport vehicle to pass through the current driving interval, wherein the time information about the starting station corresponding to the current driving interval is the time information about the public transport vehicle arriving at the terminal station corresponding to the previous driving interval.

2. The driving timetable generation method according to claim 1, wherein the separation point is an intersection, and the step of calculating, on the basis of the standard driving speed curve, the interval road section end moment of each of the interval road sections comprises:
  calculating, on the basis of the standard driving speed curve of the interval road section, the arrival moment when the public transport vehicle arrives at the end point of the interval road section, wherein the end point of the interval road section is an entrance of the intersection; and
  judging whether the arrival moment is within an intersection green-light period corresponding to the intersection,
  if so, and arrival moments of the public transport vehicle and adjacent vehicles satisfy moment threshold, taking the arrival moment as the interval road section end moment of the public transport vehicle in the corresponding interval road section; and
  if not, adjusting the arrival moment, and taking the adjusted arrival moment as the interval road section end moment of the public transport vehicle in the corresponding interval road section.

3. The driving timetable generation method according to claim 2, wherein the separation point is a speed limit zone, the step of calculating, on the basis of the standard driving speed curve, the interval road section end moment of each of the interval road sections comprises:
  calculating, on the basis of the standard driving speed curve of the interval road section, the arrival moment when the public transport vehicle arrives at the end point of the interval road section, wherein the end point of the interval road section is an entrance of the speed limit zone; and
  judging whether the arrival moment and arrival moments of the adjacent vehicles satisfy the moment threshold;
  if so, taking the arrival moment as an interval road section end moment of the public transport vehicle in the interval road section; and
  if not, adjusting the arrival moment, and taking the adjusted arrival moment as the interval road section end moment of the public transport vehicle in the interval road section.

4. The driving timetable generation method according to claim 2, wherein the step of obtaining, according to an end moment of each interval road section in a current driving interval, time information about the public transport vehicle arriving at the terminal station corresponding to the current driving interval comprises:
  obtaining, according to the end moment of each interval road section in the current driving interval, the arrival moment when the public transport vehicle arrives at the terminal station corresponding to the current driving interval; and
  judging whether the arrival moment and arrival moments of adjacent vehicles at the terminal station corresponding to the current driving interval satisfy the moment threshold,
  if so, taking the arrival moment as the time information about the public transport vehicle arriving at the terminal station corresponding to the current driving interval; and
  if not, adjusting the arrival moment, and taking the adjusted arrival moment as the time information about the public transport vehicle arriving at the terminal station corresponding to the current driving interval.

5. The driving timetable generation method according to claim 1, wherein the method further comprises the step of:
  generating, according to the driving timetable, vehicle operation parameters of the public transport vehicle, and sending the vehicle operation parameters to the public transport vehicle, so that the public transport vehicle travels in accordance with the vehicle operation parameters.

6. The driving timetable generation method according to claim 1, wherein the method further comprises the step of:
  simulating the driving timetable in accordance with a preset mode, so as to perfect the driving timetable, wherein the preset mode is a time mode.

7. An electronic device, comprising a memory, a processor, and a computer program stored on the memory and executable on the processor, wherein the processor, when executing the computer program, implements the steps of the driving timetable generation method according to claim 1.

8. The electronic device according to claim 7, wherein the separation point is an intersection, and the step of calculating, on the basis of the standard driving speed curve, the interval road section end moment of each of the interval road sections comprises:
  calculating, on the basis of the standard driving speed curve of the interval road section, the arrival moment when the public transport vehicle arrives at the end point of the interval road section, wherein the end point of the interval road section is an entrance of the intersection; and
  judging whether the arrival moment is within an intersection green-light period corresponding to the intersection,
  if so, and arrival moments of the public transport vehicle and adjacent vehicles satisfy moment threshold, taking the arrival moment as the interval road section end moment of the public transport vehicle in the corresponding interval road section; and
  if not, adjusting the arrival moment, and taking the adjusted arrival moment as the interval road section end moment of the public transport vehicle in the corresponding interval road section.

9. The electronic device according to claim 8, wherein the separation point is a speed limit zone, the step of calculating, on the basis of the standard driving speed curve, the interval road section end moment of each of the interval road sections comprises:
  calculating, on the basis of the standard driving speed curve of the interval road section, the arrival moment when the public transport vehicle arrives at the end point of the interval road section, wherein the end point of the interval road section is an entrance of the speed limit zone; and
  judging whether the arrival moment and arrival moments of the adjacent vehicles satisfy the moment threshold;
  if so, taking the arrival moment as an interval road section end moment of the public transport vehicle in the interval road section; and
  if not, adjusting the arrival moment, and taking the adjusted arrival moment as the interval road section end moment of the public transport vehicle in the interval road section.

10. The electronic device according to claim 8, wherein the step of obtaining, according to an end moment of each interval road section in a current driving interval, time information about the public transport vehicle arriving at the terminal station corresponding to the current driving interval comprises:
  obtaining, according to the end moment of each interval road section in the current driving interval, the arrival moment when the public transport vehicle arrives at the terminal station corresponding to the current driving interval; and judging whether the arrival moment and arrival moments of adjacent vehicles at the terminal station corresponding to the current driving interval satisfy the moment threshold, if so, taking the arrival moment as the time information about the public transport vehicle arriving at the terminal station corresponding to the current driving interval; and if not, adjusting the arrival moment, and taking the adjusted arrival moment as the time information about the public transport vehicle arriving at the terminal station corresponding to the current driving interval.

11. The electronic device according to claim 7, wherein the method further comprises the step of:

generating, according to the driving timetable, vehicle operation parameters of the public transport vehicle, and sending the vehicle operation parameters to the public transport vehicle, so that the public transport vehicle travels in accordance with the vehicle operation parameters.

12. The electronic device according to claim 7, wherein the method further comprises the step of:

simulating the driving timetable in accordance with a preset mode, so as to perfect the driving timetable, wherein the preset mode is a time mode.

* * * * *